Inventor
Kenneth Underwood.

By Victor J. Evans
Attorney

UNITED STATES PATENT OFFICE.

KENNETH UNDERWOOD, OF MONTGOMERY, ALABAMA.

TOOL.

1,242,392.  Specification of Letters Patent.  Patented Oct. 9, 1917.

Application filed May 20, 1916. Serial No. 98,864.

*To all whom it may concern:*

Be it known that I, KENNETH UNDERWOOD, a citizen of the United States, residing at Montgomery, in the county of Montgomery and State of Alabama, have invented new and useful Improvements in Tools, of which the following is a specification.

This invention relates to a tool which may be used to spread the leaves of vehicle springs apart to enable lubricant to be applied therebetween.

The primary object of the invention is to provide a tool of this character having pivotally connected members provided with handle portions with each member having a spreader so arranged with relation to each other, that when the handle portions are moved toward each other, the points on the spreaders will be forced between the leaves of the spring and spread the same apart.

Another object of the invention is to provide a tool for the purpose set forth which is so constructed that when one of the spreaders has been adjusted with relation to the other spreader to enable the vehicle spring to be passed between the points of the spreader, the tool may be used as many times as desired to spread the leaves of a vehicle spring apart without further adjustment of the spreader members.

A further object of the invention is to provide one of the pivotally connected members with a spreader having a head pivotally connected with the member and forming a shoulder which when the handle portions of the members are moved toward each other engages with the spring and forces the other spreader point on a spreader adjustably mounted on the other member between the leaves of a spring.

A still further object of the invention is to provide one of the handle members with a spring controlled latch passing through a slot in the other handle portion and engageable with a wall thereof to hold the handle portions in adjusted position.

With these and other objects in view, the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations, and modifications within the scope of the claim may be resorted to when desired.

Like characters of reference denote corresponding parts throughout the several views in the drawing, in which.

Figure 1:
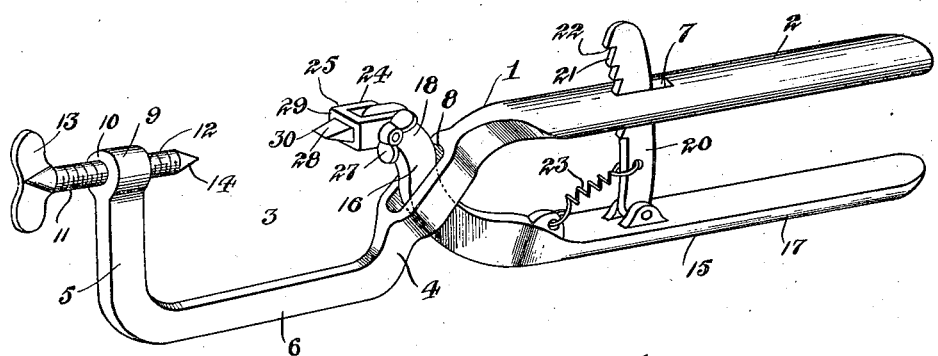
Figure 1 is a perspective view of a tool constructed in accordance with the invention.
Figure 2:
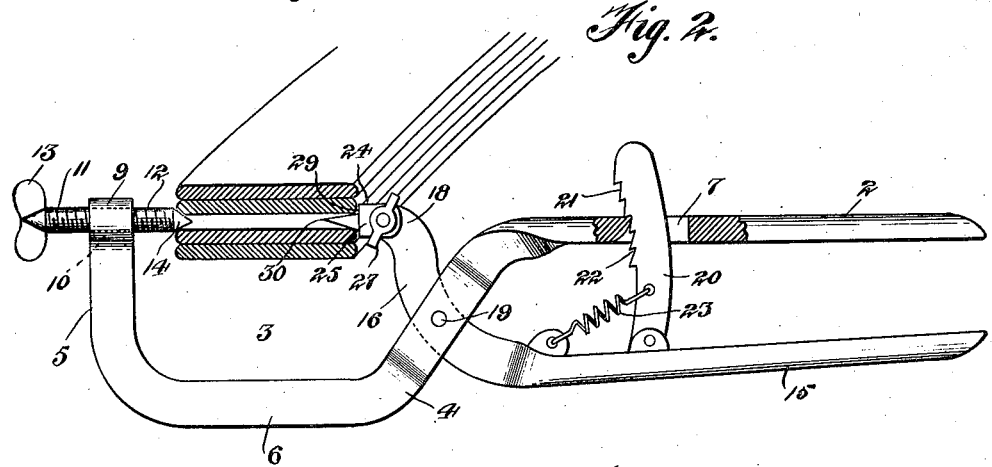
Fig. 2 is a view in elevation of the tool showing the same applied to a vehicle spring and spacing the leaves thereon apart.
Figure 3:
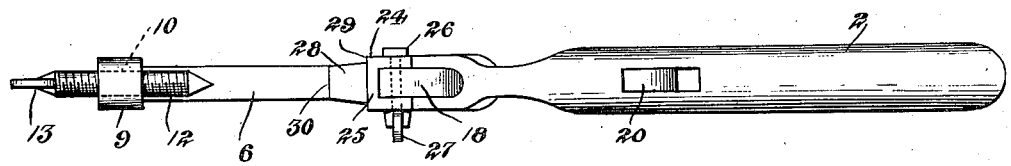
Fig. 3 is a top plan view of the tool.

Referring now to the drawing in detail, the numeral 1 designates a strip of material bent between its ends to form a handle portion 2 and a U-shaped yoke 3 having spaced and substantially parallel arms 4 and 5 connected by a portion 6.

The handle portion 2 is provided with an elongated slot 7 while the arm 4 has formed therein an elongated slot 8. The arm 5 has its free end enlarged to form a head 9 provided with a transversely extending and threaded opening 10.

A spreader 11 has a threaded shank 12 received in the opening 10, said shank being provided at one end with a winged operating head 13 and at its other end with a tapered spreader point 14.

A strip of material 15 is offset between its ends, as at 16, to form a handle portion 17 and an arm 18 spaced from the handle portion 17 and lying in a plane parallel therewith but extending in an opposite direction, said arm has formed therein a transversely extending opening.

The offset portion 16 is received in the slot 8 in the arm 4 and is pivotally connected with said arm by means of a pivot pin 19.

A latch bar 20 is received in the slot 7 in the handle portion 2 and has one end pivotally connected with the handle portion 17, said latch bar having a toothed side edge 21, the teeth 22 of which are engageable with an end wall of the slot 7.

A contractile spring 23 has one end connected with the latch bar 20 and the other end with the handle portion 17, said spring normally tending to engage one of the teeth 22 on the latch bar with the upper end of an end wall of the slot 7.

A spreader 24 has a head 25 which is forked to provide the head with a pair of spaced arms in each of which is formed an opening through which and the opening in the arm 18 is passed the shank of a bolt 26 having adjustably mounted thereon to bear against one of the arms on the spreader head, a winged nut 27 whereby the spreader head may be held in adjusted position upon the arm 18.

The head 25 of the spreader 24 is provided with a reduced extension 28 forming a shoulder 29, said extension being tapered to form a wedge shaped spreader point 30.

When it is desired to use the tool to spread the leaves of a vehicle spring apart, so that lubricant may be applied therebetween, the spreader 11 is adjusted with relation to the spreader 24 until the spring may be passed between the spreader points 14 and 30 and received in the yoke 3.

The handle portion of the tool is now grasped in the hand of the operator and pressure applied thereto to move the handle portions toward each other.

As the handle portions of the tool move toward each other, the spreader point 30 is inserted between the leaves of the spring at one side thereof, and as the handle portions continue to move toward each other, the shoulder 29 contacts with the spring and forces the spreader point 14 between the leaves thereof.

With reference to the drawing, it will be seen that as the handle portions are moved toward each other, the teeth 22 on the latch bar 20 do not obstruct such movement of the handles, but any tendency of the handles to move apart is immediately checked by the latch bar 20 under the influence of the spring 23 so that, when the leaves of the spring have been spread apart, the spreader points may be held inserted therebetween as long as desired without requiring pressure upon the handle portions of the tool to accomplish this purpose.

When it is desired to release the spreader points from between the leaves of the spring, the free end of the latch bar 20 is touched with the finger of the operator to rock the same about its pivotal connection with the handle portion 17 against the influence of the spring 22 and when the teeth on the latch bar has been released from the handle portion 2, the weight of the handle portion 17 is sufficient to retract the spreader point 30 from between the leaves of the spring and at which time, the spreader point 14 may be withdrawn from the leaves of the spring.

From the above described construction of the tool, it will at once be apparent that when the spreader 11 has been adjusted, so that a vehicle spring may be passed between the spreader points 14 and 30, the tool may be used as many times as desired to spread the leaves of a spring apart without the necessity of adjusting the spreader 11 each time the operation is performed.

Having thus described the invention, what is claimed as new, is:

In a device of the class described, a pair of crossed and pivotally connected members of unequal lengths, the shorter of said members having an opening extending transversely thereof adjacent its forward end, a spreader at the forward end of the longer member movable either toward or away from the forward end of the shorter member, a spreader head having spaced arms between which the said end of the shorter member is passed provided with openings registering with the opening adjacent the forward end of the shorter member, a bolt having its shank passed through the openings in the arms and the opening in the shorter of the members, a nut to bear on one of the arms on the spreader head adjustably mounted on the shank of the bolt, and an extension at one end of the spreader head forming shoulders thereon, said extension being tapered to provide a spreader point.

In testimony whereof I affix my signature.

KENNETH UNDERWOOD.

Witnesses:
  W. F. JOSEPH,
  A. W. COOK.